United States Patent
Naghski et al.

(10) Patent No.: US 6,422,761 B1
(45) Date of Patent: Jul. 23, 2002

(54) ANGLED OPTICAL CONNECTOR

(75) Inventors: David H. Naghski, Lewisberry; Mark A. Mentzer, Lititz, both of PA (US)

(73) Assignee: FCI Americas Technology, Inc., Reno, NV (US)

(*) Notice: Subject to any disclaimer, the term of this patent is extended or adjusted under 35 U.S.C. 154(b) by 0 days.

(21) Appl. No.: 09/518,824

(22) Filed: Mar. 6, 2000

(51) Int. Cl.[7] .................................................. G02B 6/38
(52) U.S. Cl. .............................. 385/73; 385/33; 385/92
(58) Field of Search .............................. 385/73, 33, 92, 385/44, 79, 56, 59, 78

(56) References Cited

U.S. PATENT DOCUMENTS

| | | | |
|---|---|---|---|
| 4,078,852 A | * 3/1978 | Lebduska | 385/44 |
| 4,285,570 A | 8/1981 | Minemura et al. | 350/96.18 |
| 4,302,069 A | 11/1981 | Niemi | 350/96.15 |
| 4,818,058 A | 4/1989 | Bonanni | 350/96.2 |
| 5,682,449 A | 10/1997 | Taira-Griffin | 385/47 |

* cited by examiner

Primary Examiner—Phan T. H. Palmer
(74) Attorney, Agent, or Firm—Woodcock Washburn LLP

(57) ABSTRACT

An angled optical connector optically couples received first and second optical blocks, each of which has an optical fiber embedded therein which terminates at an optical block end face. The connector has corresponding first and second ports and a reflecting surface. In one embodiment, each port has a port optical block which includes an optical fiber embedded therein which extends between and terminates at first and second port optical block end faces. The first port optical block end face is aligned with the corresponding received optical block end face such that the port optical block optical fiber as terminating at the first end face thereof is aligned with the corresponding received optical block optical fiber as terminating at the end face thereof. A lens aligns with each port optical block optical fiber as terminating at the second end face of such port optical block for collimating light exiting or entering such optical fiber. The reflecting surface is aligned to reflect collimated light from the port optical block optical fiber of the first port to the port optical block optical fiber of the second port. In another embodiment, each lens aligns directly with the optical fiber of the corresponding received optical block. In a further embodiment, each lens is dispensed with such that light reflects directly from the first port optical block to the second port optical block.

22 Claims, 3 Drawing Sheets

ANGLED OPTICAL CONNECTOR

FIELD OF THE INVENTION

The present invention relates to an optical connector and more particularly to an optical connector which can couple optical fibers at an angle.

BACKGROUND OF THE INVENTION

In electronic systems, it is becoming commonplace to transmit and receive along a waveguide using optical devices such as light transmitters and light receivers. As known, such optical devices communicate light pulses or the like to one another, and are therefore coupled to one another by optical fibers which are flexible and bendable. However, an optical fiber cannot be bent beyond a minimum radius of curvature; otherwise, light transmission through such optical fiber becomes impaired, causing loss.

In a relatively complex electronic system, such as for example a computer, a telephone switch, a video controller, or the like, multiple daughter boards may be coupled to a motherboard or a back plane at an angle (generally a right angle) thereto by way of appropriate connectors. Owing to space constraints, each connector is relatively small.

If the complex electronic system includes optical devices, it will likely be necessary to include one or more optical connection portions in at least some of the connectors. However, since each connector is relatively small, and since each optical path running through each optical connection portion likely makes a turn in the small connector, an issue arises in that making such turn within such optical connection portion may require a radius of curvature beyond the minimum, with the aforementioned impairment in light transmission resulting.

Accordingly, a need exists for an angled optical connector that can make the aforementioned turn in a relatively small space. In particular, a need exists for such an angled connector that can make the aforementioned turn without regard for any minimum radius of curvature of an optical fiber.

SUMMARY OF THE INVENTION

In the present invention, the aforementioned needs are satisfied by an angled optical connector that optically couples received first and second optical blocks, where each of the first and second optical blocks has an optical fiber embedded therein, and the optical fiber terminates at an end face of the optical block. The connector has first and second ports that respectively correspond to the first and second received optical blocks, and a reflecting surface.

In one embodiment of the present invention, each port has a port optical block which includes an optical fiber embedded therein, where the optical fiber of the port optical block extends between and terminates at first and second end faces of such port optical block. The first end face of the port optical block is aligned with the end face of the corresponding received optical block such that the optical fiber of the port optical block as terminating at the first end face thereof is aligned with the optical fiber of the corresponding received optical block as terminating at the end face thereof. Each port also has a lens aligned with the optical fiber of the port optical block as terminating at the second end face thereof for collimating light exiting or entering such optical fiber. The reflecting surface is aligned to reflect collimated light from the optical fiber of the port optical block of the first port to the optical fiber of the port optical block of the second port.

In another embodiment of the present invention, each lens aligns directly with the optical fiber of the corresponding received optical block. In a further embodiment of the present invention, each lens is dispensed with such that the reflecting surface reflects light directly from the optical fiber of the port optical block of the first port to the optical fiber of the port optical block of the second port.

BRIEF DESCRIPTION OF THE DRAWINGS

The foregoing summary, as well as the following detailed description of preferred embodiments of the present invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF PREFERRED EMBODIMENTS

Figure 1:
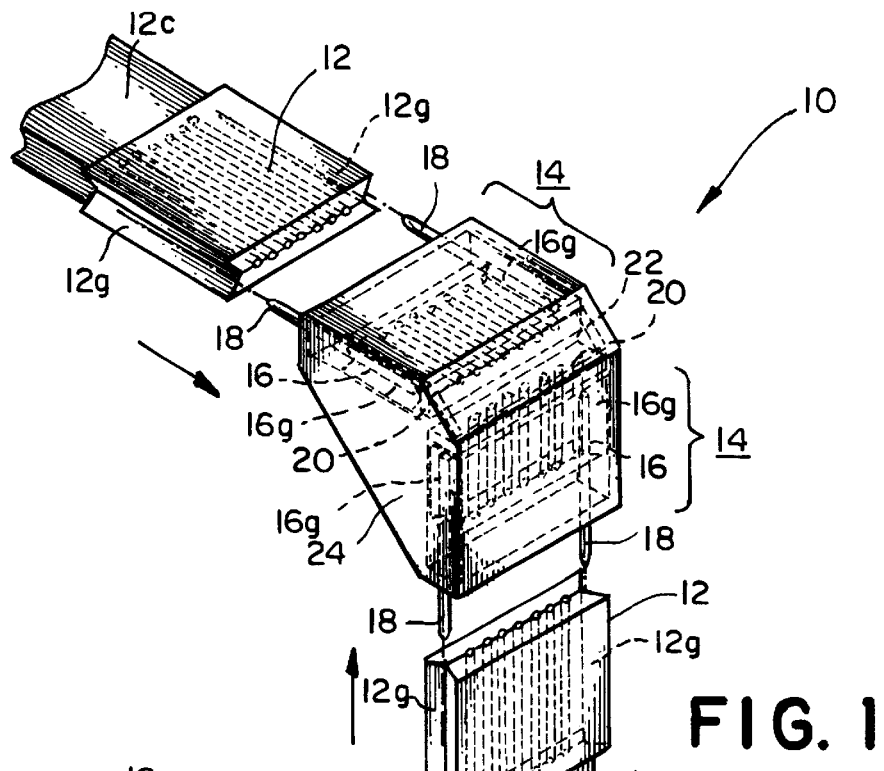
FIG. 1 is a perspective view of an angled optical connector with mating optical blocks in accordance with one embodiment of the present invention.

Certain terminology may be used in the following description for convenience only and is not considered to be limiting. The words "left", "right", "upper", and "lower" designate directions in the drawings to which reference is made. The words "inwardly" and "outwardly" are further directions toward and away from, respectively, the geometric center of the referenced object. The terminology includes the words above specifically mentioned, derivatives thereof, and words of similar import.

Figure 2:
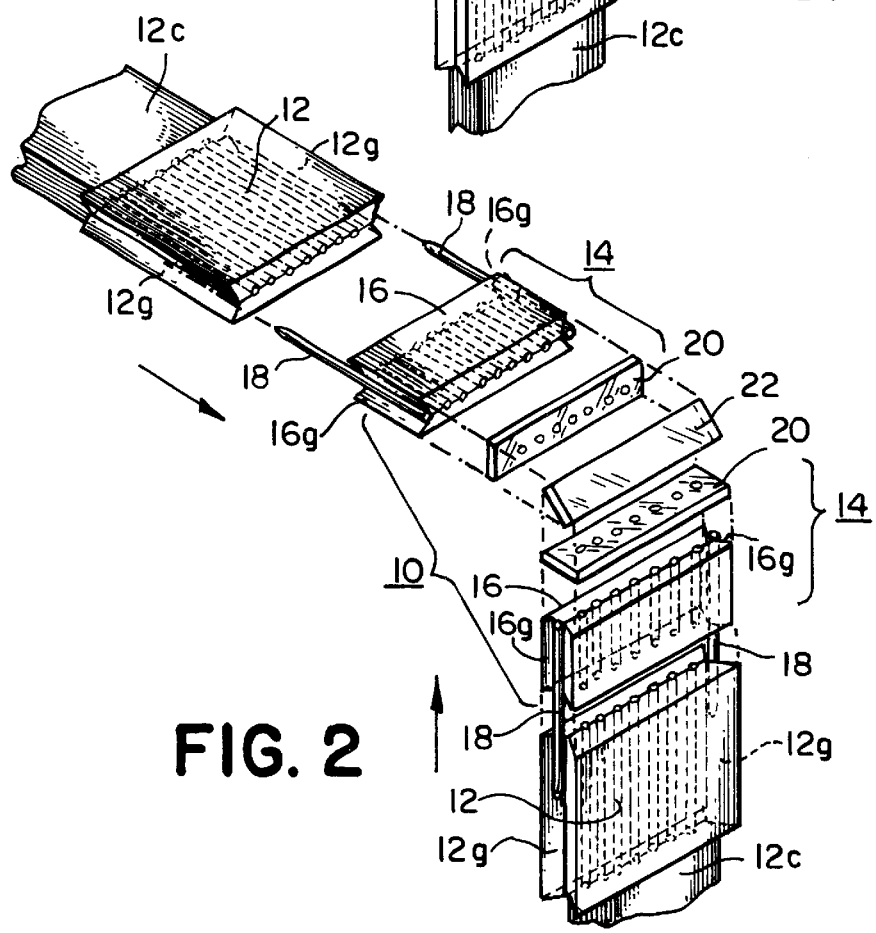
FIG. 2 is an exploded perspective view of the angled optical connector and mating optical blocks of FIG. 1, with the connector housing omitted for the sake of clarity.
Figure 6:
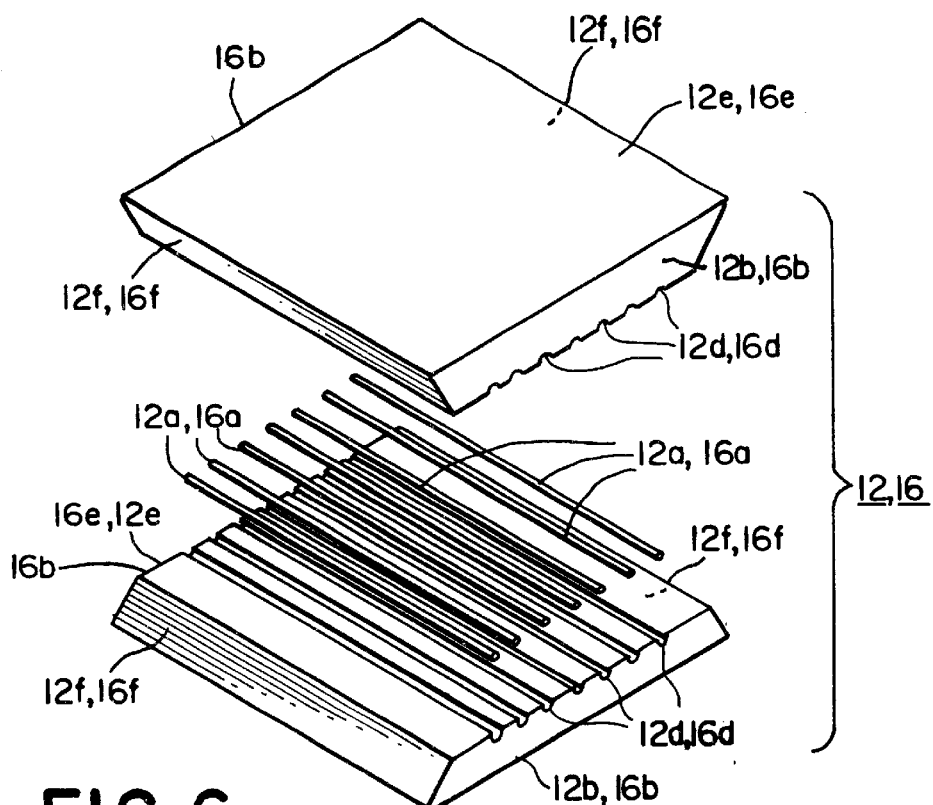
FIG. 6 is an exploded perspective view of an optical block employed in the angled optical connectors of FIGS. 1–5 and also employed as the mating optical blocks.

Referring now to the drawings, wherein like numerals are used to indicate like elements throughout, there is shown in FIGS. 1 and 2 an angled adapter or optical connector 10 that can mate with ferrules on optical blocks 12 on mating connectors (not shown), which may be designated as first and second optical blocks 12, in accordance with gone embodiment of the present invention. As seen in phantom in FIG. 1, connector 10 can be part of a larger housing H. Housing H can have a suitable retention feature (such as a latch) to secure the connectors C which house the optical blocks 12 having the ferrules. As best seen in FIG. 6, each of the first and second optical blocks 12 has one or more optical fibers 12a embedded therein, where the optical fiber 12a terminates at an end face 12b of such optical block 12.

In one embodiment of the present invention, and as shown, each optical fiber 12a begins at one end face 12b of such optical block 12, travels along a pathway within the block 12, and then extends from the other end face 12b of the block 12 and then onward. As shown, the portions of the optical fibers 12a external to the block 12 may be surrounded with a protective coating so the individual fibers are bundled into an optical cable 12c. Alternatively, the external portions may proceed directly to an adjacent optical device (not shown).

Typically, each mating block 12 includes a pair of silicon or glass sheets 12e that sandwich the fibers 12a therebetween. As shown in FIG. 6, each sheet 12e may includes a plurality of generally parallel grooves 12d, one for each fiber 12a. As also shown, each sheet 12e may be provided with a bevel 12f at both lateral sides thereof such that the finished block 12 includes a V-groove 12g (FIGS. 1 and 2) at each lateral side thereof. As will be explained in more detail below, such V-grooves 12g may be employed as keying features during alignment of each block 12 with the connector 10 during coupling thereof. U.S. Pat. No. 4,818,058, hereby incorporated by reference, describes silicon ferrules in more detail. Although shown as using silicon ferrules, any other suitable type of optical system could be used, such as for example embedded fiber routing circuits, polymeric waveguides, etc., without departing from the spirit and scope of the present invention.

Each mating block 12 may be housed within a housing (not shown) for protection purposes or otherwise. Such housing may for example be employed if the mating block 12 is at the end of a cable 12c, although other situations may also suggest the use of a housing. Any particular housing may be employed without departing from the spirit and scope of the present invention. Note that connector 10 could accommodate fibers 12a arranged in a two-dimensional grid of rows and/or columns, perhaps with one or the other of the rows and columns being staggered (not shown), although such an arrangement may require that such mating block 12 be constructed from a number of sheets 12e greater than two, or else more than one mating block 12. The design and construction of such a mating block or blocks 12 and of a housing for such mating block(s) 12 follows the design of the single mating block 12 as shown and therefore need not be discussed herein in any detail.

As should now be understood, the connector 10 optically couples the received mating optical blocks 12 such that such received mating blocks 12 and the optical fibers 12a therein reside at an angle with respect to each other. As seen in FIGS. 1 and 2, the angle is approximately a right angle, although it is to be appreciated that other angles can be employed without departing from the spirit and scope of the present invention. As coupled, information in the form of light pulses may be generated at a source (not shown), passed between one or more corresponding pairs of optical fibers 12a in the received mating optical blocks 12, and then on to an ultimate destination (not shown). As such, the connector 10 may be employed as at least a portion of a connector connecting a mother board-daughter board in the manner discussed above. In addition, the connector 10 may be used in any other situation where an angled connection is required, or in any situation where an optical fiber is required to make a turn having a radius of curvature beyond the minimum for such optical fiber.

Referring again to FIGS. 1 and 2, in one embodiment of the present invention, the connector 10 includes first and second ports 14 that respectively correspond to and receive the first and second received optical blocks 12. Each port 14 can have a port optical block 16 that includes one or more optical fibers 16a embedded therein. Similar to the mating block 12, and referring now to FIG. 6, in each port optical block 16, each optical fiber 16a extends between and terminates at first and second end faces 16b of such port optical block 16. Differently than the mating block 12, in the port optical block 16, each optical fiber 16a could remain within the periphery of such block 16.

As with the mating block 12, each port optical block 16 may include a pair of silicon or glass sheets 16e that sandwich the fibers 16a therebetween; a plurality of generally parallel grooves 16d, one for each fiber 16a; and a bevel 16f at both lateral sides of each sheet 16e forming a V-groove 16g (FIGS. 1 and 2) at each lateral side thereof. In fact, the mating block 12 and the port optical block 16 may be substantially identical, but for the extending fibers 12a in the mating block 12 (shown in phantom in FIG. 6). Note that not all fibers 12a in the mating block 12 need have corresponding fibers 16a in the port optical block, and vice versa. However, each 'active' fiber 12a (i.e., fiber 12a intended to be used to transport a signal) in the mating block 12a should have such a corresponding fiber 16a in the port optical block 16. As with the mating block 12, the design and construction of such a port block 16 is known and therefore need not be discussed further here.

Preferably, the first end face 16b of the port optical block 16 (i.e., the end face 16b that faces toward the corresponding received mating block 12) is brought into close contact with and is aligned with the end face 12b of the corresponding received mating block 12 such that each optical fiber 16a of the port optical block 16 terminating at the first end face 16b thereof is aligned with the corresponding optical fiber 12a of the corresponding received optical block 12 as terminating at the end face 12b thereof. Preferably the first end face 16b of the port optical block 16 is butted against the end face 12b of the corresponding received mating block 12 in such aligned arrangement. Accordingly, light originating from any particular fiber 12a, 16a of either block 12, 16 is efficiently transmitted from such block to the corresponding fiber 16a, 12a of the other block 16, 12.

In one embodiment of the present invention, to assure such alignment, each of the first and second ports 14 has an aligning device 18 for coupling the corresponding received optical block 12 and the port optical block 16 thereto. As should be appreciated from FIGS. 1 and 2, such aligning device 18 may comprise a pair of aligning pins 18 that extend from the V-grooves on the sides of the port optical block 16 toward the V-grooves on the corresponding received optical block 12. In this manner, pins 18 could be a part of blocks 16. Of course, the pins 18 may alternately be associated with the corresponding received optical block 12 and couple with apertures in the port optical block 16. Preferably, the pins are securely positioned in the V-grooves 12g, 16g of one of the corresponding received optical block 12 or the port optical block 16 using known techniques, and the aligning apertures comprise the V-grooves 16g, 12g of the other of the corresponding received optical block 12 or the port optical block 16. Preferably, the blocks 12, 16 are constructed to a precision necessary to rely on such V-grooves 12g, 16g for such alignment.

In one embodiment of the present invention, and as seen in FIGS. 1 and 2, each port 14 also has a lens 20 aligned with each optical fiber 16a of the port optical block 16 as terminating at the second end face 16b thereof (i.e., the end face opposite the corresponding received optical block 12). As should be appreciated, such lens 20 is employed to collimate light exiting or entering such optical fiber 16a, thus producing a relatively parallel beam of light exiting or entering such optical fiber 16a. If the block 16 has multiple fibers 16a, the lenses 20 associated with such block 16 are preferably in the form of an appropriately configured lens array 20, as is shown. Such lenses/lens array 20 may be formed from a silicon or glass material. Of course, depending on the wavelength of the light employed in connection therewith, one material may be preferred over the other.

Preferably the second end face 16b of the port optical block 16 is butted against the lens/lens array 20 in aligned arrangement. Accordingly, light is efficiently transmitted between the block 16 and the lens/lens array 20. The lens/lens array 20 and the second end face 16b of the port optical block 16, and also the reflecting surface 22 (described below) may each include complementary keying devices (not shown) to ensure the aforementioned aligned arrangement. For example, a series of peaks, depressions, ridges, valleys, etc. may be etched into the lens/lens array 20, the second end face 16b of the port optical block 16, and/or the reflecting surface 22 to ensure alignment is passively achieved. Alternately, a pin/aperture arrangement similar to that discussed above in connection with the blocks 12, 16 may be employed. Further, the housing 24 (described below) could have suitable features (not shown) to provide alignment as appropriate. The design and construction of collimating lenses/lense arrays and keying features is known and therefore need not be discussed herein in any further detail.

As shown in FIGS. 1 and 2, the first and second end faces 16b of each port optical block 16 are generally opposing end faces 16b. Nevertheless, such end faces can be other than opposing without departing from the spirit and scope of the present invention.

In the present invention, the angled optical connector avoids the issue of minimum radius of curvature in an optical fiber by transmitting received light from one port 14 to the other port by way of an appropriately aligned reflecting surface 22. In particular, the reflecting surface 22 as aligned reflects collimated light from each optical fiber 16a of the port optical block 16 of the first port 14 to the optical fiber 16a of the port optical block 16 of the second port 14. In one embodiment of the present invention, the reflecting surface 22 is a polished surface such as a mirror, although other reflecting surfaces 22 may be employed without departing from the spirit and scope of the present invention. For example, the reflecting surface may be a light splitter, as will be discussed in more detail below. Similarly, the reflecting surface 22 may be a flat surface or a focusing surface without departing from the spirit and scope of the present invention. Although described as a reflecting surface, any reflective, refractive, or diffractive optical element could be employed as the reflecting surface without departing from the spirit and scope of the present invention.

The alignment of the reflecting surface 22 with respect to the ports 14 should be done with accuracy. Nevertheless, such accuracy need not be very high when the connector 10 is to be employed in some applications. Accordingly, passive alignment features may be employed such as those discussed above (pins and apertures, ridges, valleys, peaks, depressions, etc.) or the like. Of course, in some other applications, alignment accuracy must be very high. In this instance, appropriate active alignment techniques should be employed. As is to be appreciated, such active alignment requires some sort of feedback to positively identify when such high-accuracy alignment has been achieved. Methods and systems for such high-accuracy active alignment are known and therefore need not be described in any more detail herein.

Once alignment of the reflecting surface 22 with respect to the ports 14 has been achieved, the reflecting surface 22 is preferably securely fixed in place in the connector 10 by an epoxy or the like. Of course, this assumes that the ports 14 have already been securely fixed in place or formed in the connector 10. Preferably, the connector 10 includes a housing 24 within which the reflecting surface 22 and the ports 14 all reside and are all securely fixed. Such housing 24, then, maintains the alignment of the reflecting surface 22 with respect to the port optical blocks 16 of the first and second ports 14. The housing 24 may be constructed of any suitable material, such as a plastic or a metal, without departing from the spirit and scope of the present invention.

As should now be understood, when the connector 10 is coupled to the two mating blocks 12 by way of the ports 14, information in the form of light is generated at a source (not shown), passes into one of the mating blocks 12, then through the end face 12b thereof and into the corresponding port optical block 16 through the first end face 16b thereof. Such light then passes through such port optical block 16, through the second end face 16b thereof, and into the corresponding lens array 20 where the light is collimated and directed toward the reflecting surface 22. The light is then reflected off the reflecting surface 22 at the prescribed angle and is thereby directed toward the lense array 20 of the other port optical block 16, where such light is focused onto the corresponding fiber 16a on the second end face 16b of the port optical block 16. Such light then passes through such port optical block 16, through the first end face 16b thereof and into the corresponding received optical block 12 through the end face 12b thereof. After passing through the corresponding received optical block, the light then continues onward to an ultimate destination (not shown).

In one embodiment of the present invention, the connector 10 is comparable in size to a typical electrical back plane connector which couples a daughter board to a mother board or to a back plane (not shown). As a result, such connector 10 may be incorporated within such a back plane connector.

Figure 3:
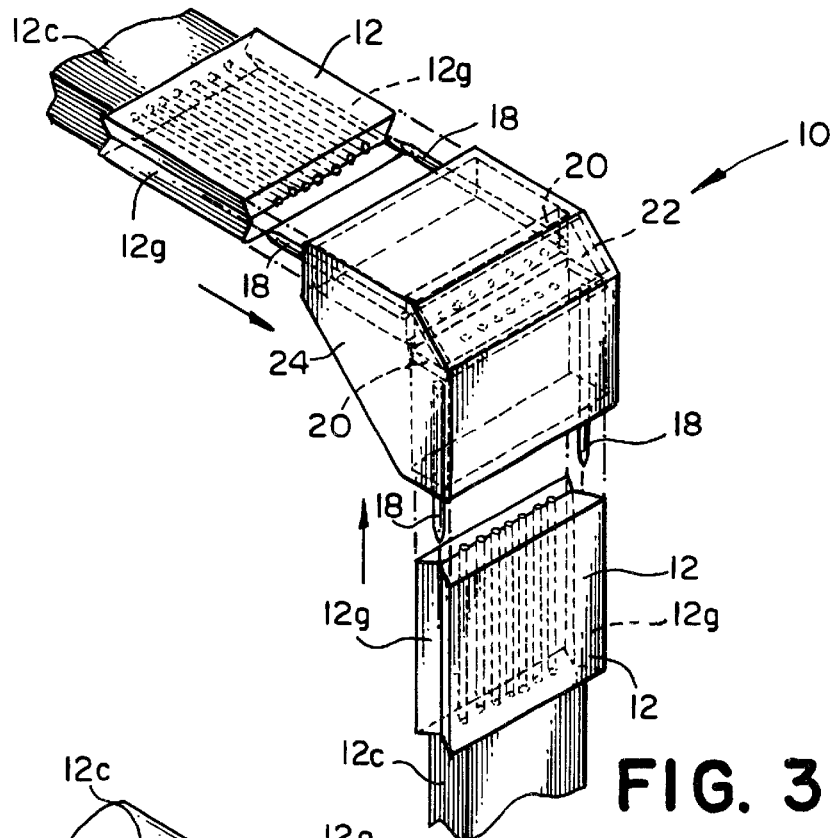
FIGS. 3 and 4 are perspective views of angled optical connectors with mating optical blocks in accordance with other embodiments of the present invention.

In another embodiment of the present invention, and referring now to FIG. 3, the port optical block 16 in each port 14 of the embodiment of the connector 10 of FIGS. 1 and 2 is dispensed with. Accordingly, each mating block 12 as received butts up directly against a respective lens array 20. As a result, light emitted from the end face 12b of one of the mating blocks 12 then passes directly into the corresponding lens array 20, and vice versa. As seen in this embodiment, an aligning device 18 such as the aligning pins 18 extends directly from adjacent the lens array 20 toward the mating block 12. Of course, other aligning devices may be employed without departing from the spirit and scope of the present invention.

Although shown as mating with two mating blocks 12, connector 10 could mate with only one mating block 12 (not shown). In this instance, the opposite end of connector 10 would have a permanent optical connection. Connector 10 could therefore be non-releasably secured to a substrate such as a multi-layer board or a printed circuit board.

Figure 4:
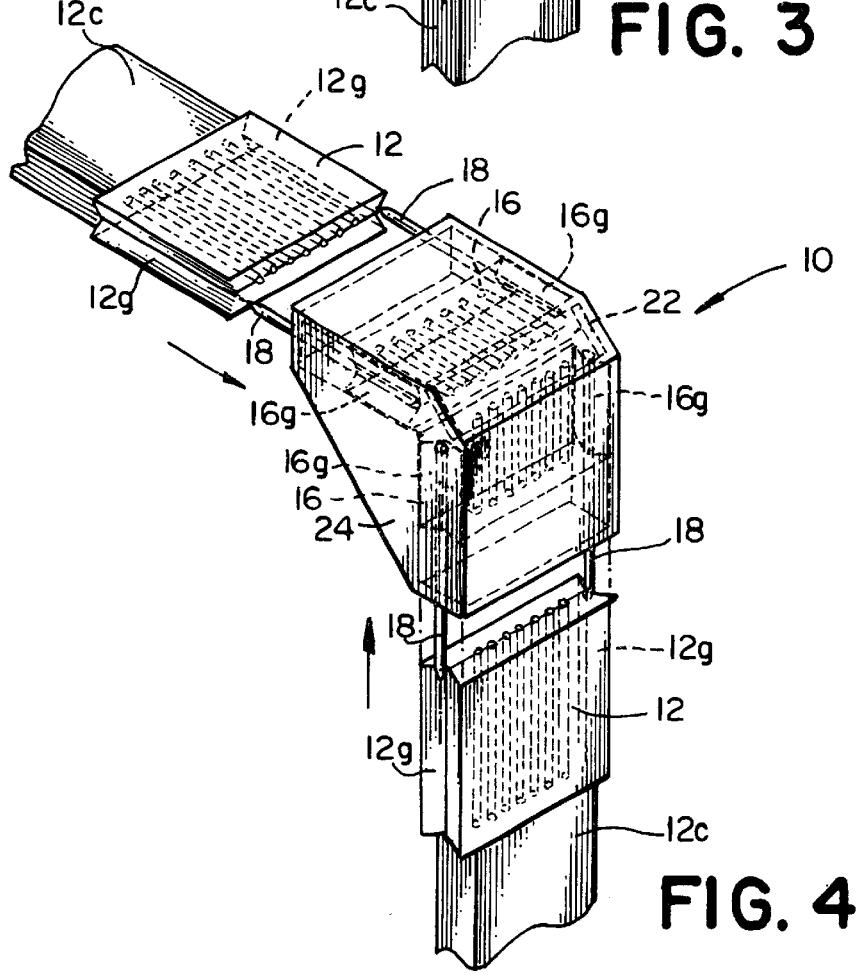

In still another embodiment of the present invention, and referring now to FIG. 4, the lens array 20 in each port 14 of the embodiment of the connector 10 of FIGS. 1 and 2 is dispensed with. Accordingly, light entering and exiting each port optical block 12 is not collimated before or after being reflected in the reflecting surface 22. Of course, such an arrangement is only to be used in instances where collimating the light is not believed to be necessary.

Figure 5:
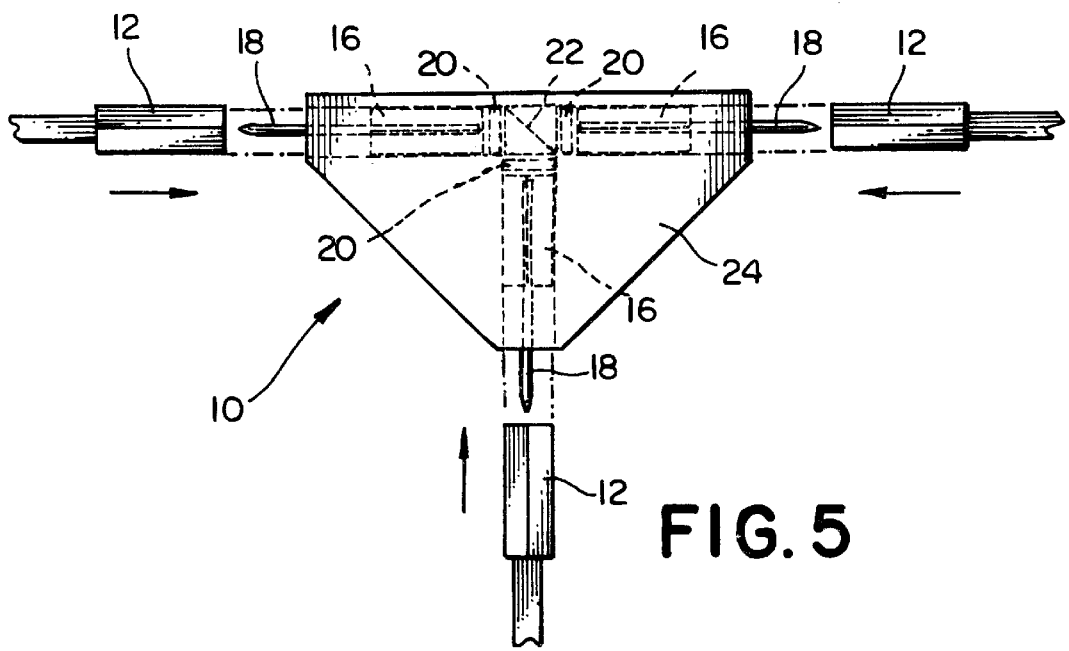
FIG. 5 is a side view of an angled optical connector with mating optical blocks in accordance with another embodiment of the present invention.

In a variation on any of the aforementioned embodiments, and referring now to FIG. 5 (which includes both the port optical block 16 and the lens array 20 in each port 14), the connector 10 optically couples received first, second, and third optical blocks 12, and therefore has at least corresponding first, second, and third ports 14. Here, the reflecting surface 22 is a splitter which is aligned to reflect light from the optical fiber 16a of the port optical block 16 of the first port 14 (up and to the left in FIG. 5) to the optical fiber 16a of the port optical block 16 of the second port 14 (up and to the right in FIG. 5) and also to the optical fiber 16a of the port optical block 16 of the third port 14 (down and in the middle in FIG. 5). In the splitter-connector 10 of FIG. 5, each port optical block 16 may be dispensed with (as with the connector 10 shown in FIG. 3) or each lens array 20 may be dispensed with (as with the connector 10 shown in FIG. 4) without departing from the spirit and scope of the present invention.

In the present invention, an angled optical connector 10 turns optical information without regard for any minimum radius of curvature of an optical fiber. While the present invention has been described in connection with the embodiments as shown in FIGS. 1–6, it is to be understood that other similar embodiments may be used or modifications and additions may be made to the described embodiments for performing the same function of the present invention without deviating therefrom. Therefore, the present invention should not be limited to any single embodiment, but rather construed in breadth and scope in accordance with the recitation of the appended claims.

What is claimed is:

1. An angled optical connector for optically coupling received first and second optical blocks, each of the first and second optical blocks comprising a plurality of optical fibers embedded therein, each optical fiber terminating at an end face of the optical block thereof, the connector comprising:

first and second ports respectively corresponding to the first and second received optical blocks, each port having a lens array having a plurality of lenses and aligned with the end face of the corresponding received optical block such that each optical fiber of the corresponding received optical block as terminating at the second end face thereof is aligned with a respective lens, each lens for collimating light exiting or entering the corresponding optical fiber; and a reflecting surface aligned to reflect collimated light from each optical fiber of the corresponding received optical block of the first port to a respective optical fiber of the corresponding received optical block of the second port.

2. The optical connector of claim 1 for optically coupling received first, second, and third optical blocks, each of the first, second, and third optical blocks comprising an optical fiber embedded therein, each optical fiber terminating at an end face of the optical block thereof, the connector comprising:

first, second, and third ports respectively corresponding to the first, second, and third received optical blocks, each port having a lens array having a plurality of lenses and aligned with the end face of the corresponding received optical block such that each optical fiber of the corresponding received optical block as terminating at the second end face thereof is aligned with a respective lens, each lens for collimating light exiting or entering the corresponding optical fiber; and a reflecting surface aligned to reflect collimated light from each optical fiber of the corresponding received optical block of the first port to a respective optical fiber of the corresponding received optical block of the second port and to a respective optical fiber of the corresponding received optical block of the third port.

3. The optical connector of claim 1 wherein each of the first and second ports further has an aligning device for coupling with the corresponding received optical block and aligning the lens thereto.

4. The optical connector of claim 1 further comprising a housing within which the first and second ports and the reflecting surface reside, the housing maintaining the alignment of the reflecting surface with respect to the port optical blocks of the first and second ports.

5. An angled optical connector for optically coupling received first and second optical blocks, each of the first and second optical blocks comprising an optical fiber embedded therein, the optical fiber terminating at an end face of the optical block, the connector comprising:

first and second ports respectively corresponding to the first and second received optical blocks, each port having a port optical block including an optical fiber embedded therein, the optical fiber of the port optical block extending between and terminating at first and second end faces of such port optical block, the first end face of the port optical block being aligned with the end face of the corresponding received optical block such that the optical fiber of the port optical block as terminating at the first end face thereof is aligned with the optical fiber of the corresponding received optical block as terminating at the end face thereof; and a reflecting surface aligned to reflect light from the optical fiber of the port optical block of the first port as terminating at the second end face thereof to the optical fiber of the port optical block of the second port as terminating at the second end face thereof.

6. The optical connector of claim 5 wherein each of the first and second ports further has an aligning device for coupling with the corresponding received optical block and aligning the port optical block thereto.

7. The optical connector of claim 6 wherein the aligning device comprises a member selected from a group consisting of:

an aligning pin extending toward the corresponding received optical block for coupling with an aligning aperture in such corresponding received optical block; and an aligning aperture for coupling with an aligning pin in such corresponding received optical block and extending toward the port optical block.

8. The optical connector of claim 5 for optically coupling received first, second, and third optical blocks, each of the first, second, and third optical blocks comprising an optical fiber embedded therein, the optical fiber terminating at an end face of the optical block, the connector comprising:

first, second, and third ports respectively corresponding to the first, second, and third received optical blocks, each port having a port optical block including an optical fiber embedded therein, the optical fiber of the port optical block extending between and terminating at first and second end faces of such port optical block, the first end face of the port optical block being aligned with the end face of the corresponding received optical block such that the optical fiber of the port optical block as terminating at the first end face thereof is aligned with the optical fiber of the corresponding received optical block as terminating at the end face thereof; and a reflecting surface aligned to reflect light from the optical fiber of the port optical block of the first port as terminating at the second end face thereof to the optical fiber of the port optical block of the second port as terminating at the second end face thereof and to the optical fiber of the port optical block of the third port as terminating at the second end face thereof.

9. The optical connector of claim 5 wherein each of the first and second optical blocks comprises a plurality of optical fibers embedded therein, each optical fiber of the first or second optical blocks terminating at an end face thereof, wherein each port has a port optical block including a plurality of optical fibers embedded therein, each optical fiber of the port optical block extending between and terminating at first and second end faces thereof, the first end face of the port optical block being aligned with the end face of the corresponding received optical block such that each optical fiber of the port optical block as terminating at such first end face thereof is aligned with a respective optical fiber of the corresponding received optical block as terminating at the end face thereof, and wherein the reflecting surface is aligned to reflect light from each optical fiber of the port optical block of the first port as terminating at the second end face thereof to a respective optical fiber of the port optical block of the second port as terminating at the second end face thereof and to a respective optical fiber of the port optical block of the third port as terminating at the second end face thereof.

10. The optical connector of claim 5 wherein the first and second end faces of each port optical block are generally opposing end faces.

11. The optical connector of claim 5 further comprising a housing within which the first and second ports and the reflecting surface reside, the housing maintaining the alignment of the reflecting surface with respect to the port optical blocks of the first and second ports.

12. An angled optical connector for optically coupling received first and second optical blocks, each of the first and second optical blocks comprising an optical fiber embedded therein, the optical fiber terminating at an end face of the optical block, the connector comprising:

first and second ports respectively corresponding to the first and second received optical blocks, each port having:
a port optical block including an optical fiber embedded therein, the optical fiber of the port optical block extending between and terminating at first and second end faces of such port optical block, the first end face of the port optical block being aligned with the end face of the corresponding received optical block such that the optical fiber of the port optical block as terminating at the first end face thereof is aligned with the optical fiber of the corresponding received optical block as terminating at the end face thereof; and
a lens aligned with the optical fiber of the port optical block as terminating at the second end face thereof for collimating light exiting or entering such optical fiber; and
a reflecting surface aligned to reflect collimated light from the optical fiber of the port optical block of the first port to the optical fiber of the port optical block of the second port.

13. The optical connector of claim 12 wherein each of the first and second ports further has an aligning device for coupling with the corresponding received optical block and aligning the port optical block thereto.

14. The optical connector of claim 13 wherein the aligning device comprises a member selected from a group consisting of:
an aligning pin extending toward the corresponding received optical block for coupling with an aligning aperture in such corresponding received optical block; and
an aligning aperture for coupling with an aligning pin in such corresponding received optical block and extending toward the port optical block.

15. The optical connector of claim 12 for optically coupling received first, second, and third optical blocks, each of the first, second, and third optical blocks comprising an optical fiber embedded therein, the optical fiber terminating at an end face of the optical block, the connector comprising:

first, second, and third ports respectively corresponding to the first, second, and third received optical blocks, each port having:
a port optical block including an optical fiber embedded therein, the optical fiber of the port optical block extending between and terminating at first and second end faces of such port optical block, the first end face of the port optical block being aligned with the end face of the corresponding received optical block such that the optical fiber of the port optical block as terminating at the first end face thereof is aligned with the optical fiber of the corresponding received optical block as terminating at the end face thereof; and
a lens aligned with the optical fiber of the port optical block as terminating at the second end face thereof for collimating light exiting or entering such optical fiber; and
a reflecting surface aligned to reflect collimated light from the optical fiber of the port optical block of the first port to the optical fiber of the port optical block of the second port and to the optical fiber of the port optical block of the third port.

16. The optical connector of claim 12 wherein each of the first and second optical blocks comprises a plurality of optical fibers embedded therein, each optical fiber of the first or second optical blocks terminating at an end face thereof, wherein each port has:
a port optical block including a plurality of optical fibers embedded therein, each optical fiber of the port optical block extending between and terminating at first and second end faces thereof, the first end face of the port optical block being aligned with the end face of the corresponding received optical block such that each optical fiber of the port optical block as terminating at such first end face thereof is aligned with a respective optical fiber of the corresponding received optical block as terminating at the end face thereof; and
a lens array having a plurality of lenses and aligned with the second end face of the port optical block such that each optical fiber of the port optical block as terminating at the second end face thereof is aligned with a respective lens, each lens for collimating light exiting or entering the respective optical fiber of the port optical block; and
wherein the reflecting surface is aligned to reflect collimated light from each optical fiber of the port optical block of the first port to a respective optical fiber of the port optical block of the second port.

17. The optical connector of claim 12 wherein the first and second end faces of each port optical block are generally opposing end faces.

18. The optical connector of claim 12 further comprising a housing within which the first and second ports and the reflecting surface reside, the housing maintaining the alignment of the reflecting surface with respect to the port optical blocks of the first and second ports.

19. An angled optical connector for optically coupling first and second optical components, each of the first and second optical components comprising a plurality of optical fibers, the connector comprising:

first and second ports respectively corresponding to the first and second optical components; and first and second lens arrays respectively associated with the first and second ports, each lens array having a plurality of lenses, each lens being aligned with a respective optical fiber of the respective optical component for collimating/focusing light exiting/entering such optical fiber; and a reflecting surface aligned to reflect collimated light from the optical fibers of the first port to the optical fibers of the second port.

20. An angled optical connector for optically coupling received first and second optical blocks, each of the first and second optical blocks comprising an optical fiber embedded therein, the optical fiber terminating at an end face of the optical block, the connector comprising:

first and second ports respectively corresponding to the first and second received optical blocks, each port having a lens aligned with the optical fiber of the corresponding received optical block as terminating at the second end face thereof for collimating light exiting or entering such optical fiber; and a reflecting surface aligned to reflect collimated light from the optical fiber of the corresponding received optical block of the first port to the optical fiber of the corresponding received optical block of the second port, each of the first and second ports further having an aligning device for coupling with the corresponding received optical block and aligning the lens thereto, the aligning device comprising a member selected from a group consisting of:

an aligning pin extending toward the corresponding received optical block for coupling with an aligning aperture in such corresponding received optical block; and an aligning aperture for coupling with an aligning pin in such corresponding received optical block and extending toward the lens.

21. The optical connector of claim 20 for optically coupling received first, second, and third optical blocks, each of the first, second, and third optical blocks comprising an optical fiber embedded therein, the optical fiber terminating at an end face of the optical block, the connector comprising:

first, second, and third ports respectively corresponding to the first, second, and third received optical blocks, each port having a lens aligned with the optical fiber of the corresponding received optical block as terminating at the second end face thereof for collimating light exiting or entering such optical fiber; and a reflecting surface aligned to reflect collimated light from the optical fiber of the corresponding received optical block of the first port to the optical fiber of the corresponding received optical block of the second port and to the optical fiber of the corresponding received optical block of the third port.

each of the first, second, and third ports further having an aligning device for coupling with the corresponding received optical block and aligning the lens thereto, the aligning device comprising a member selected from a group consisting of:

an aligning pin extending toward the corresponding received optical block for coupling with an aligning aperture in such corresponding received optical block; and an aligning aperture for coupling with an aligning pin in such corresponding received optical block and extending toward the lens.

22. The optical connector of claim 20 further comprising a housing within which the first, second, and third ports and the reflecting surface reside, the housing maintaining the alignment of the reflecting surface with respect to the port optical blocks of the first, second, and third ports.

* * * * *